United States Patent
Holtmanns et al.

(10) Patent No.: US 9,716,990 B2
(45) Date of Patent: Jul. 25, 2017

(54) METHOD TO DISABLE A NETWORK ACCESS APPLICATION IN A SECURE ELEMENT

(75) Inventors: Silke Holtmanns, Klaukkala (FI); Rune Adolf Lindholm, Sottunga (FI)

(73) Assignee: Nokia Technologies Oy, Espoo (FI)

( * ) Notice: Subject to any disclaimer, the term of this patent is extended or adjusted under 35 U.S.C. 154(b) by 40 days.

(21) Appl. No.: 14/411,316

(22) PCT Filed: Jul. 6, 2012

(86) PCT No.: PCT/IB2012/053476
§ 371 (c)(1),
(2), (4) Date: Sep. 29, 2015

(87) PCT Pub. No.: WO2014/006457
PCT Pub. Date: Jan. 9, 2014

(65) Prior Publication Data
US 2016/0037318 A1     Feb. 4, 2016

(51) Int. Cl.
| | | |
|---|---|---|
| H04M 11/04 | (2006.01) | |
| H04W 4/22 | (2009.01) | |
| H04W 8/18 | (2009.01) | |
| H04W 12/06 | (2009.01) | |
| H04W 12/08 | (2009.01) | |

(52) U.S. Cl.
CPC ............. *H04W 4/22* (2013.01); *H04W 8/18* (2013.01); *H04W 12/06* (2013.01); *H04W 12/08* (2013.01)

(58) Field of Classification Search
CPC ....... H04W 4/22; H04W 12/06; H04W 12/08; H04W 8/18; H04W 76/007; H04M 2242/04
USPC ............................................ 455/404.1–404.2
See application file for complete search history.

(56) References Cited

U.S. PATENT DOCUMENTS

| | | | |
|---|---|---|---|
| 2004/0022216 A1 | 2/2004 | Shi | |
| 2010/0064341 A1* | 3/2010 | Aldera | H04L 63/102 726/1 |
| 2010/0197350 A1* | 8/2010 | Jeung | H04W 8/183 455/558 |
| 2011/0076981 A1* | 3/2011 | Singh | H04M 1/673 455/404.1 |

(Continued)

FOREIGN PATENT DOCUMENTS

| | | |
|---|---|---|
| DE | 102005014639 A1 | 10/2006 |
| EP | 1827049 A2 | 8/2007 |
| EP | 2083398 A1 | 7/2009 |

(Continued)

OTHER PUBLICATIONS

International Search Report and Written Opinion received for corresponding Patent Cooperation Treaty Application No. PCT/IB2012/053476, dated Jun. 27, 2013, 16 pages.

(Continued)

*Primary Examiner* — Marcus Hammonds
(74) *Attorney, Agent, or Firm* — Mintz Levin Cohn Ferris Glovsky and Popeo, P.C.

(57) ABSTRACT

A method comprises causing a network access application or cellular authentication in a secure element to be disabled by changing a status of security information. In one embodiment, a method is provided to disable the network access applications of a UICC, in case of an emergency call, by resetting a verification status of the PIN.

18 Claims, 5 Drawing Sheets

(56) References Cited

U.S. PATENT DOCUMENTS

2012/0052832 A1* 3/2012 Bleckert ............ H04L 63/0853
455/404.1
2013/0052981 A1* 2/2013 Zarri .................. H04W 76/007
455/404.1

FOREIGN PATENT DOCUMENTS

WO 0069183 11/2000
WO 2009051377 4/2009

OTHER PUBLICATIONS

Smart Cards; UICC—Terminal interace; Physical and logical characteristics (Release 8); ETSI TS 102 221 V8.2.0 (Jun. 2009).
Supplementary European Search Report for Application No. EP12880658, issued Feb. 11, 2016. (2 pages).

* cited by examiner

METHOD TO DISABLE A NETWORK ACCESS APPLICATION IN A SECURE ELEMENT

RELATED APPLICATION

This application was originally filed as PCT Application No. PCT/IB2012/053476 filed Jul. 6, 2012.

FIELD

The invention relates to a method and apparatus and in particular but not exclusively to a method and apparatus for making emergency calls.

BACKGROUND

A communication system enables communication between two or more communication devices such as user terminals, base stations and/or other nodes by providing carriers between the communication devices. In a wireless communication system at least a part of communications between at least two stations occurs over wireless interfaces. A user can access a communication system by means of an appropriate communication device or terminal. A communication device is provided with an appropriate signal receiving and transmitting apparatus for enabling communications, for example enabling access to a communication network or communications directly with other users. The communication device may access one or several carriers provided by a station, for example a base station of a cell, and transmit and/or receive communications on the carriers.

The communication device is provided with at least one SIM (subscriber identity module) or similar functionality for network access (e.g. IP Multimedia Subsystem SIM (ISIM), CDMA (code division multiple access) SIM (C-SIM), removable user identity module (R-UIM), universal SIM (USIM), 2G SIM). The SIM maybe provided on a removable card or may be embedded in an integrated circuit. For example the SIM may be provided on a UICC (Universal integrated circuit card). The SIM or similar functionality may have information defining networks to which the associated communication device is forbidden to connect.

SUMMARY

According to any aspect there is provided a method comprising: causing a network access application or cellular authentication in a secure element to be disabled by changing a status of security information.

The causing may be responsive to information being provided that said network access application is to be disabled.

The information may be entered by a user.

The information may be responsive to an occurrence of an event.

The event may comprise an input of emergency call information.

The method may comprise responsive to emergency call information being entered, comparing said emergency call information with at least one stored emergency call information and if there is a match, disabling said network access application.

The secure element may comprise one or more of a universal integrated card and a subscriber identity module.

The causing may comprise additionally disabling all of said secure element or at least one additional application on said secure element.

The security information may comprise a personal identification number.

A status of said personal identification number may be changed by changing a verification status of said personal identification number.

The method may comprise causing said network access application to be activated using said security information.

The network access application may be activated after an event which causes said disabling of said network access application.

The network access application may be activated by an input of said security information.

An apparatus may be provided to perform any of the previous methods. The method may be performed in an apparatus. The method may be performed in a user equipment.

According to another aspect, there is provided a computer program comprising computer executable instructions which when run cause the any one of the above methods to be performed.

According to another aspect, there is provided an apparatus comprising at least one processor and at least one memory including computer code for one or more programs, the at least one memory and the computer code configured, with the at least one processor, to cause the apparatus at least to: cause a network access application or cellular authentication to be disabled in a secure element by changing a status of security information.

The at least one memory and the computer code may be configured with the at least one processor to cause the apparatus to cause the network access application to be disabled responsive to information being provided that said network access application is to be disabled.

The information may be entered by a user.

The information may be responsive to an occurrence of an event.

The at least one memory and the computer code may be configured with the at least one processor to cause the apparatus to, responsive to an emergency call information being entered, compare said emergency call information with at least one stored emergency call information and if there is a match, to disable said network access application.

The secure element may comprise one or more of a universal integrated card and a subscriber identity module.

The at least one memory and the computer code may be configured with the at least one processor to cause the apparatus to cause additionally the disabling of all of said secure element or at least one additional application on said secure element.

The security information may comprise a personal identification number.

The at least one memory and the computer code may be configured with the at least one processor to cause the apparatus to cause a status of said personal identification number to be changed by changing a verification status of said personal identification number.

The at least one memory and the computer code may be configured with the at least one processor to cause the apparatus to cause said network access application to be activated using said security information.

The at least one memory and the computer code may be configured with the at least one processor to cause the apparatus to cause said network access application to be activated after an event which caused said disabling of said network access application.

The at least one memory and the computer code may be configured with the at least one processor to cause the apparatus to said network access application to be activated by an input of said security information.

According to another aspect, there is provided an apparatus comprising: means for causing a network access application or cellular authentication in a secure element to be disabled by changing a status of security information.

The causing means may be responsive to information being provided that said network access application is to be disabled.

The information may be entered by a user.

The information may be responsive to an occurrence of an event.

The event may comprise an input of emergency call information.

The apparatus may comprise comparing means for, responsive to emergency call information being entered, comparing said emergency call information with at least one stored emergency call information and if there is a match, causing said network access application to be disabled.

The secure element may comprise one or more of a universal integrated card and a subscriber identity module.

The causing means may be for additionally disabling all of said secure element or at least one additional application on said secure element.

The security information comprises a personal identification number.

The causing means may be for changing a status of said personal identification number by changing a verification status of said personal identification number.

The causing means may be for activating said network access application using said security information.

The causing means may be for activating said network access application is after an event which caused said disabling of said network access application.

The causing means may be activating said network access application by an input of said security information.

A user equipment may comprise any of the above apparatus.

BRIEF DESCRIPTION OF FIGURES

Embodiments will now be described in further detail, by way of example only, with reference to the following examples and accompanying drawings, in which.

DETAILED DESCRIPTION OF EMBODIMENTS

In the following certain exemplifying embodiments are explained with reference to a wireless communication system serving devices adapted for wireless communication. Therefore, before explaining in detail the exemplifying embodiments, certain general principles of a wireless system, components thereof, and devices for wireless communication are briefly explained with reference to system 10 of FIG. 1, and communications device 20 of FIG. 2 to assist in understanding the technology underlying the described examples.

A communication device can be used for accessing various services and/or applications provided via communication systems. In wireless or mobile communication systems the access is provided via a radio module instance of the wireless access interface between mobile communication devices and an appropriate access system. A communication device may access wirelessly a communication system via a base station. The base station may be a macro, micro, femto (Home (e) Node base station) or pico base station.

Figure 1:
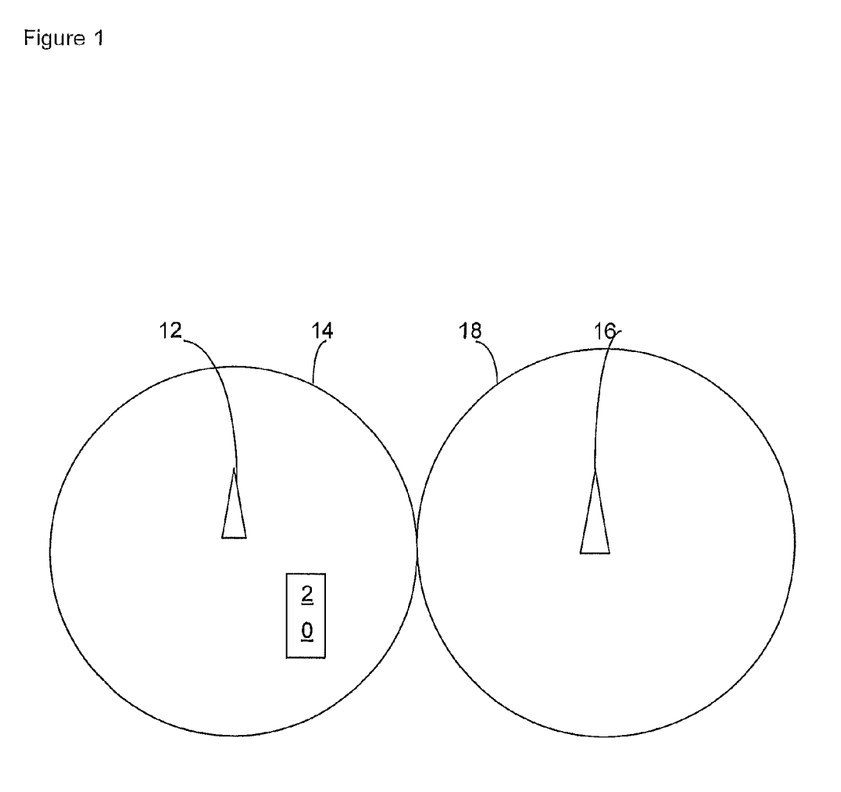
FIG. 1 shows an example of a system wherein below described embodiments may be implemented.

FIG. 1 shows by way of example a first base station 12 providing a first cell 14 and a second base station 16 providing a second cell 18. This is a simplified version of the network. In practice a base station can provide more than one cells. There may also be base stations arranged to have cells overlying at least partially other cells. Of course in practice more than two base stations may be provided. An enabled terminal may connect to more than one network and base station. It should be appreciated that in FIG. 1, one network is shown. In practice more than one network may be provided which may at least partially overlap the network shown.

The different networks may be provided by different network providers. The networks may operate in accordance with different standards.

Also shown in FIG. 1 is a communication device 20 in the cell 14 associated with the first base station. The communication device 20 and base station may have one or more radio channels open at the same time and may receive signals from more than one source or network operator.

An example of a standardized architecture is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. A development of the LTE is often referred to as LTE-Advanced (LTE-A). Many markets move forward to utilize this technology and develop their own customized version of the technology by means of local standards e.g. China.

A communication device can access a communication system based on various access techniques, such as code division multiple access (CDMA), or wideband CDMA (WCDMA). The latter technique is used by communication systems based on the third Generation Partnership Project (3GPP) specifications and in some of the standardization in China. Other examples include time division multiple access (TDMA), frequency division multiple access (FDMA), space division multiple access (SDMA) or orthogonal frequency division multiple (OFDMA).

Figure 2:
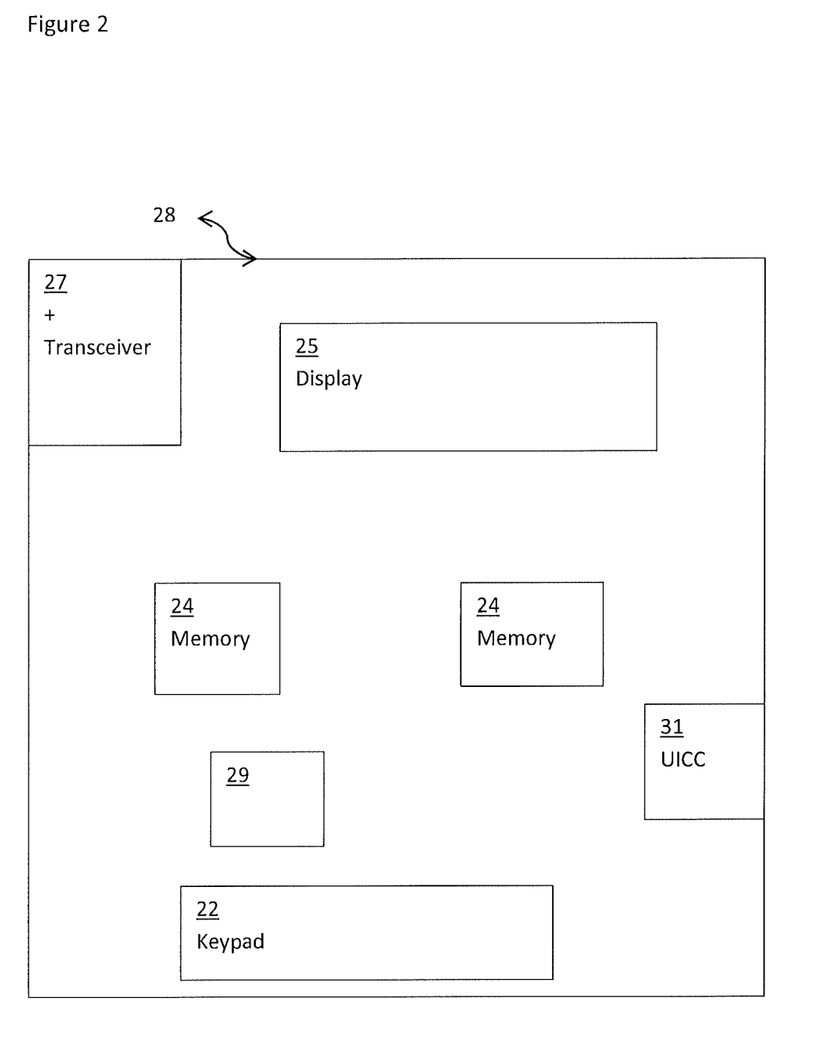
FIG. 2 shows an example of a communication device.

FIG. 2 shows a schematic, view of a communication device 20 that a user can use for communications. Such a communication device is often referred to as user equipment (UE) or terminal. The communication device may be mobile or have a generally fixed location. The device might be a consumer product like a cellular phone or any other device enabled with cellular capability (smart device or device-to-device communication). An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities or a tablet or laptop with one or more wireless modems, or any combinations of these or the like. A communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A communication device is typically provided with at least one data processing entity 23, at least one memory 24 and other possible components 29 for use in software and hardware aided execution of tasks it is designed to perform, including control of access to and communications with base stations and other communication devices. The user may control the operation of the communication device by means of a suitable user interface such as key pad 22, voice commands, touch sensitive screen or pad, combinations thereof or the like. A display 25, a speaker and a microphone are also typically provided. Furthermore, a communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 2 transceiver apparatus is designated schematically by block 27. The transceiver apparatus is provided with radio capability. The transceiver may be provided for example by means of a radio part and associated antenna arrangement. The antenna arrangement may be arranged internally or externally to the mobile device.

Embodiments may provide a device having set of access credentials. The set may comprise one or more access credentials. Examples of access credentials may be SIM (subscriber identification module) cards, USIM (universal subscriber identification module) applications on UICC (Universal Integrated Circuit Card) cards, and/or an embedded chip (eUICC) which holds the access credentials and related information and applications.

Figure 3:
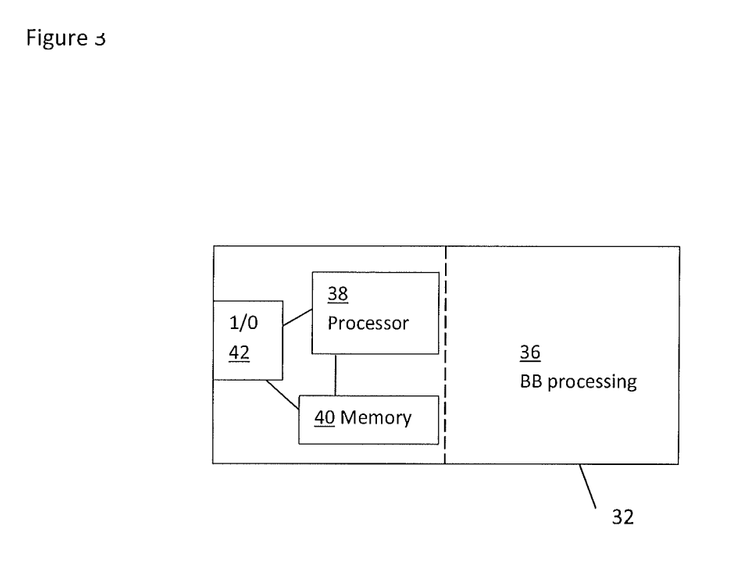
FIG. 3 shows an example of a UICC.

For example, a UICC 31 is provided which may be provided on a eUICC. In alternative embodiments, any other suitable secure data store may be used instead of the UICC. The UICC has a secure module that may hold one or several network access applications (NAA) which contain cryptographic keys and related network data. Examples of such applications are SIM, USIM, IP Multimedia Subsystem SIM (ISIM), CDMA SIM (C-SIM), removable user identity module (R-UIM). The UICC may also contain other applications that require entering of a personal identification number (PIN), for example banking applications, public transport applications, loyalty applications, credit or pre-paid applications.

The UICC or secure data store may have more than one application making it possible for example to access different types of network and/or the same type of network operated by different operators. In some embodiments there may be one UICC. In alternative embodiments there may be two or more UICCs in one device and each of them holding NAA for different network operators.

Currently if a SIM (subscriber identity module) card or UICC (universal integrated circuit card) is inserted into the user equipment, the user equipment will try to use the networks available with that SIM card/UICC. However, if the connection or coverage is not very good, this may lead to the situation that the user has no coverage from an operator which is allowed by the network parameters provided on the SIM card/UICC. The network parameters may be part of the elementary file. The elementary file may include information on forbidden PLMN (public land mobile network). If the user removes the card, this may allow the user equipment to use networks for the emergency call which are not allowed by the SIM card or UICC to be used. This behavior is recommended in some countries.

Where a user is roaming, the user can use his user equipment with the SIM card only with the network carriers or operators with which his home operator has a contract. If the SIM card is removed, the user in principle may be able to use any carrier or network operator in order to make an emergency call.

However, this behavior is not possible for an embedded UICC. This is because the embedded SIM would be physically present.

The inventors have appreciated that there may be other reasons why a UICC should be disabled. For example, in some telecommunication standards specifications, the usage of the UICC is mandated, when it is available. This may imply that the user is bound to a specific network access, for example he has to use the UICC and associated network (even when roaming). This may be necessary even if a cheaper network type were available. In these cases, non-cellular applications such as ticketing and payments should still be available to the user.

It should be appreciated that in some countries it is required that the SIM card be present for emergency calls. This is due to regulatory requirements in order to be able to trace the caller. In other countries emergency calls have to be possible with a user equipment even if the SIM card is not present.

In some embodiments, a method is provided to disable the network access applications of a UICC. In particular, the UICC may be a eUICC (embedded UICC).

If the eUICC is a separate integrated circuit, then the user equipment may simply cut off power to the eUICC to disable the NAA. However, this solution may not always be appropriate. For example, some eUICC may be provided in conjunction with applications such as payment, ticketing, NFC (near Field communication). If the eUICC is powered down, these applications would not be available. Additionally or alternatively, this approach would not work if the UICC is part of another chip such as the base band chip.

In some embodiments, a verification status of the PIN (personal identification number) can be reset. Currently, once verified, the PIN verification status remains valid until the power to the SIM card or UICC card is removed. In some embodiments, a command is used to reset the verification status of the PIN, making the SIM/USIM/ISIM application unavailable to the user equipment. This has a similar function as removing the SIM card or UICC.

It should be appreciated that this resetting of the verification status of the PIN can be used to disable the SIM or the relevant part of the UICC.

In some embodiments, a new command is provided to reset the verification status of the PIN. Alternatively or additionally, an extension to the existing verify PIN and/or disable PIN commands can be used to reset the verification status of the PIN. In this scenario the PIN verification has to be enabled as the access to the relevant NAA will be prohibited by the PIN. If the PIN verification is disabled it means that access is always granted, the PIN verification status has no meaning and logically is set to "verified".

In some embodiments, the user equipment has access to emergency call codes which are stored in the elementary file for emergency call codes (EF_ECC). The file is provided on the USIM and remains available even if the PIN verification status has been reset. The ECC file is present on the USIM, the USIM is the 3GPP NAA on a UICC.

Figure 4:
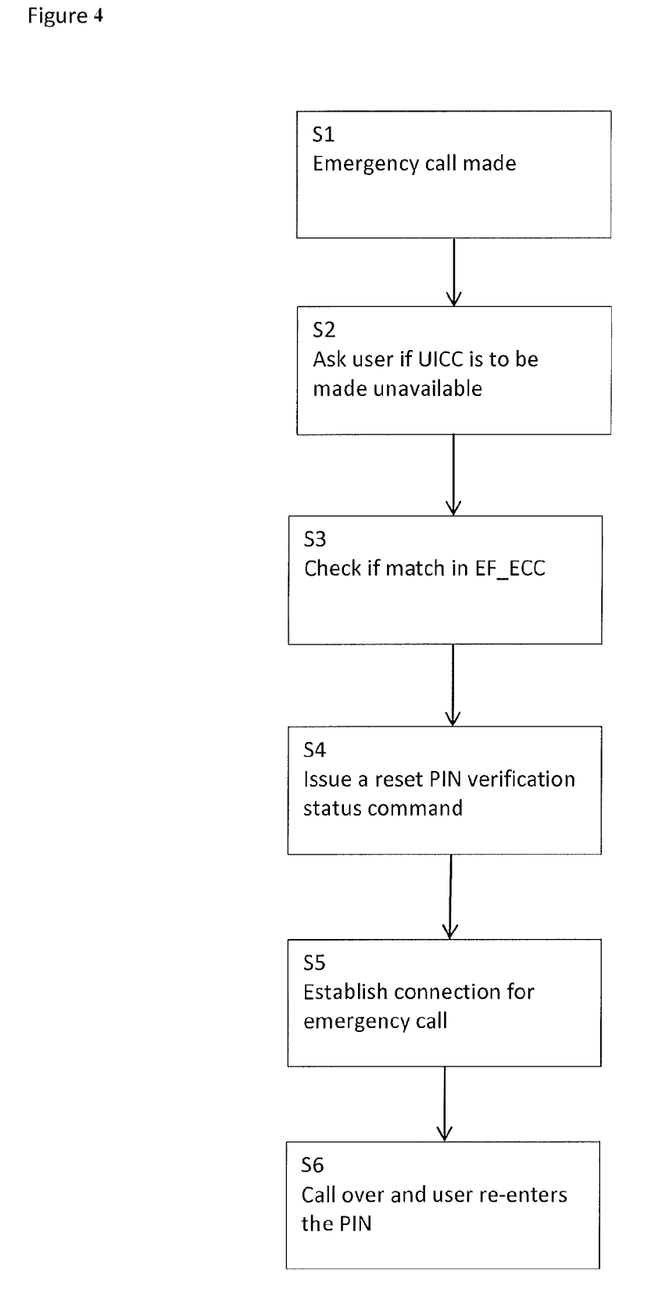
FIG. 4 shows a first method.

Reference is made to FIG. 4 which shows a method of an embodiment.

In step S1, a user equipment is used by a user to make an emergency call.

In step S2, the user is asked to indicate if at least the NAA of the UICC and/or SIM should be made unavailable. In some embodiments, the user equipment may be configured to automatically make the NAA of the UICC and/or SIM automatically unavailable if the end user makes an emergency call. In some embodiments, all of the UICC or SIM is made unavailable.

In step S3, a check is made by the user equipment. In particular, the user equipment determines if the input emergency call code matches an emergency call code included in the UICC. It should be appreciated that in some embodiments, the country in which the user is located is taken into account when determining if there is a match. Local numbers may be stored in the UE and/or local numbers may be downloaded to the terminal. In some embodiments, there may be some local numbers in the UE and additional numbers are downloaded to the terminal.

In some embodiments, step S3 may take place before step S2. In some embodiments, the check may be performed by the processor of the user equipment running suitable program code.

In step S4, the user equipment will issue a reset PIN verification status command to the UICC. Optionally, in some embodiments the user may be prompted to provide an input prior to the UE issuing the reset PIN verification status command. The issuing of the reset PIN verification command may be dependent on the input from the user. The user maybe requested to indicate if the user is to input the PIN at this stage or any alternative indication. The input requested from the user may be OK or not OK or the like.

Alternatively in an emergency situation the user may not be asked and the UE may use a "trial and error approach" to get an emergency line for the user.

In step S5, the user equipment establishes a new connection to the most suitable operator for the emergency call. The user equipment is free to choose any network or network operator. Thus, the user equipment is effectively able to override the EF_FPLMN list which indicates the networks to which the user equipment is forbidden to attach normally. Of course in some embodiments, the user equipment may be alternatively or additionally overriding a list which indicates only those networks to which the user equipment is permitted to attach.

In step S6, the user equipment determines that the emergency call is completed. The user equipment is then prompted to re-enter the PIN and is back to normal operation with his operator. In order for the UE to work, after the emergency call, the PIN has to be enabled. The verification status is reset in order to prevent the access. The user then needs to re-enter the PIN in order to get the access. The terminal may automatically re-enter the PIN without user involvement in some alternative embodiments.

Figure 5:
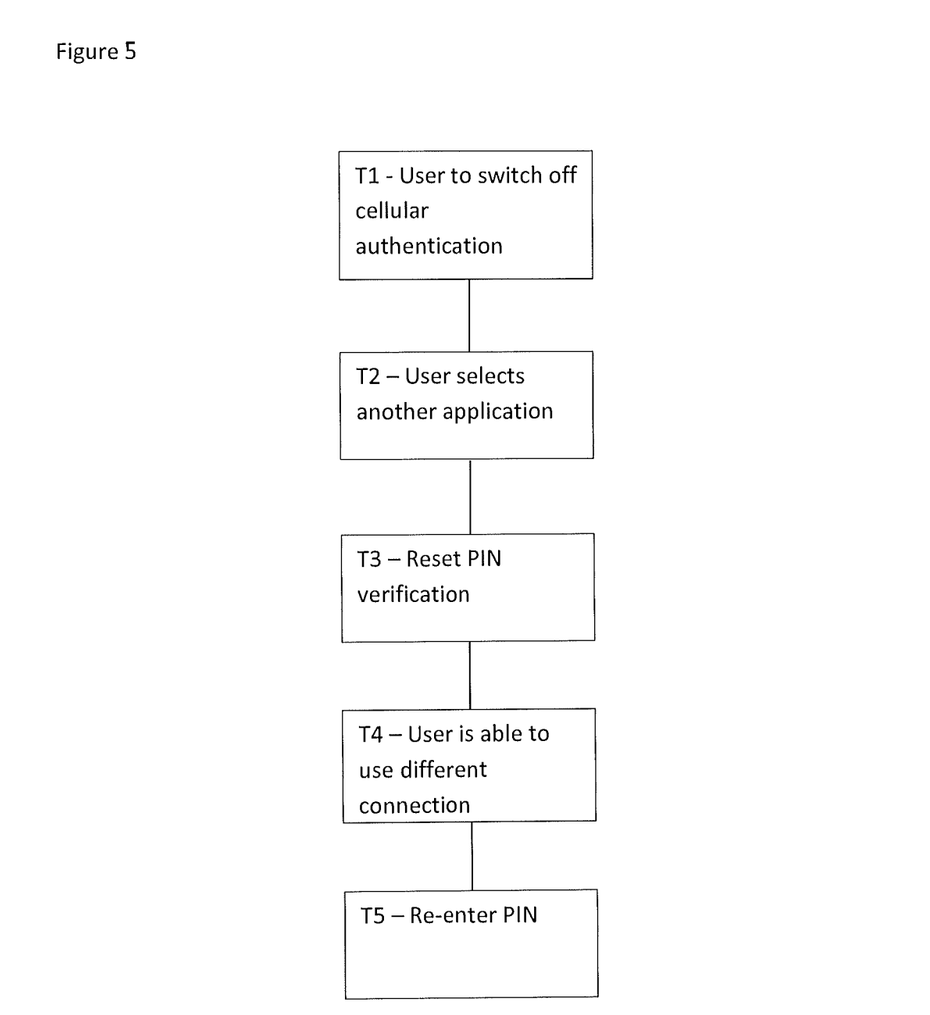
FIG. 5 shows a second method.

Reference is now made to FIG. 5 which shows another embodiment. In this embodiment, the UICC is disabled for a reason other than emergency calls. This may be for example for cheaper network connectivity. It should be appreciated that the network access application on the UICC which enables the user equipment connectivity may be a USIM (universal SIM) ISIM (integrated SIM) C-SIM (CDMA (code division multiple access) SIM), a SIM or similar. A UICC may hold a range of applications such as USIM, payment, secure ID or the like.

In step T1, the user wants to prevent access to the NAA i.e. no mobile authentication run is made with the network and the user equipment does not need to take into account the content in EF FPLMN, which would prevent it from using certain networks. This may as defined in for example standards 3GPP TS 33.102 and TS. 33.401). Cellular authentication is the authentication protocol) that is run to authenticate the mobile device to the cellular network and (depending on protocol) also the cellular network to the terminal.

In order to prevent the authentication from being possible, access to the NAA is prevented. In order to prevent that, there are two alternatives. Disabling it, which works always, or by not verifying the access condition to it, i.e. enter the PIN. The latter only works if the end user has the PIN verification enabled, and this can be changed by the user. In step T2, the user equipment selects another application on the same logical channel. The logical channel is a connection between an endpoint, application, in the terminal and an application on the UICC. In this case the UICC security system automatically will reset the PIN verification status. This is required in order to prevent a third party, or third party application, to access an application on the UICC, e.g. USIM, ISIM, SIM using the granted access that the user has provided by entering the PIN for the application that is about to be selected. If the PIN verification status is reset it requires that the third party has to have knowledge about the PIN value in order to get access. If the correct PIN value is not known to this third party it will not be able to get access, as it not able to perform a successful PIN verification. This behaviour is specified in order to prevent third party access to an application using the access granted by the user or somebody else. This behaviour is required in order to prevent unauthorised access by a potential malicious application in the user equipment or remotely.

In step T3, the PIN verification is reset. This maintains security integrity. In particular, the user is requested that they input the PIN.

In step T4, user equipment may not be able to make some payment applications but when for example doing single sign on, the user does no need to use cellular credentials and connectivity from the USIM. In other words, the user can use, NFC, WLAN or the like.

In step T5, if the user equipment wants to switch on the cellular or cellular authentication functionality, the user equipment re-enters the PIN.

Thus, in some embodiments, it is possible to disable the whole UICC, an application on the UICC or a profile associated with the UICC. A profile can be considered to be the combination of a file structure, data and applications to be provided onto or present on the UICC.

Embodiments have been described in terms of a UICC. It should be appreciated that other embodiments can be performed in association with other entities such as SIM cards or variants thereof. Some terminals support "flight mode" or the like and in this case the user would switch off the UICC in order to prevent any unintended network access. If the users switch off the UICC then the user would not be able in the flight mode to use payment or NFC payment applications on the UICC. Accordingly, in some embodiments it may be desirable to only switch off the NAA.

In some embodiments, if there is a software crash when the UICC is in the disabled phase, the cellular mode or NAA can be switched on again by entering the PIN.

Embodiments may not cut off the power to the entire UICC. Rather, in some embodiments, a network access application or a profile including a network access application may be disabled. This means that there may be other applications on the UICC which may be used whilst the UICC is partially disabled. This may be of use where the UICC functionality is integrated with other functions such as baseband or modem functions.

Some embodiments may be used in conjunction with a SIM or any other suitable secure element.

Embodiments may be used where a communications device has at least one secure module or element. This secure module or element maybe a removable or non-removable part of the communications device. Alternatively or additionally the secure module or element may be provided as part of the modem implementation. This secure module may be a SIM card, a UICC or other secure data store. The secure module may have processing capability associated there with.

Whilst PIN management is described by way of example, it should be appreciated that some embodiments may alternatively or additionally use passwords or other access tokens.

A subscription in some embodiments may be used is used to describe an operator profile or application e.g. CSIM (CDMA SIM), USIM, ISIM (IP Multimedia Subsystem SIM), R-UIM (removable user identity module), SIM or a combination of those. The operator profile or application might be stored on a removable secure element (UICC, secure data card) or non-removable eUICC. Any combination of the above is also possible.

A 4 digit PIN is one method requested from the user, However alternatively or additionally some embodiments may use more or less than a four digit pin, a password and/or other user provided access token.

Reference is made by way of example to FIG. 3 which shows schematically a eUICC 32. The eUICC may include one or more of at least one processor 38, at least one memory 40 and an input/output 42. The memory may take any suitable format. The eUICC also has an additionally functionality which may be for example baseband processing 36.

It should be appreciated that the embodiments may be implemented by one or more computer programs running on one or more processors, hardware, firmware, dedicated circuits or any combinations of two or more of the above. Some embodiments may make use of one or more memories. For example the computer programs may comprise computer executable instructions which may be stored in one or more memories. When run, the computer program(s) may use data which is stored in one or more memories. The secure module may comprise at least some memory and/or at least some processing functions which may perform some of the steps of the methods.

It is noted that whilst embodiments have been described in relation to certain architectures, similar principles can be applied to other communication systems.

Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the scope of the present invention.

The invention claimed is:

1. A method comprising:
    disabling, in response to an emergency call information being entered into a terminal, a network access application and/or a cellular authentication in a secure element by at least revoking an authentication of a personal identification number;
    placing, at the terminal and in response to the revoking of the authentication of the personal identification number, an emergency call based on the emergency call information;
    requesting, during the emergency call, entry of the personal identification number at the terminal; and
    authenticating, in response to entry of the personal identification number, the personal identification number, the authenticating of the personal identification number enabling the network access application and/or the cellular authentication in the secure element.

2. A method as claimed in claim 1, wherein said emergency call information is entered by a user.

3. A method as claimed in claim 1, wherein said emergency call information is responsive to an occurrence of an event.

4. A method as claimed in claim 3, wherein said event comprises an input of emergency call information.

5. A method as claimed in claim 1, wherein responsive to an emergency call information being entered, comparing said emergency call information with at least one stored emergency call information and if there is a match, disabling said network access application.

6. A method as claimed in claim 1, wherein said secure element comprises one or more of a universal integrated circuit card and a subscriber identity module.

7. A method as claimed in claim 6, further comprising, at least:
    disabling all of said secure element or at least one additional application on said secure element.

8. A method as claimed in claim 1, wherein a status of said personal identification number is changed by changing a verification status of said personal identification number.

9. A method as claimed in claim 1, comprising causing said network access application and/or cellular authentication to be activated using said personal identification number.

10. A method as claimed in claim 9, wherein said network access application is activated after an event which caused said disabling of said network access application and/or cellular authentication.

11. A method as claimed in claim 9, wherein said network access application and/or cellular authentication is activated by an input of said personal identification number.

12. The method of claim 1, wherein the network access application includes at least cryptographic keys for providing secure access to at least a feature of a network.

13. The method of claim 1, wherein the cellular authentication includes an authentication protocol that is run to authenticate the terminal to a cellular network.

14. An apparatus comprising at least one processor and at least one memory including computer code for one or more programs, the at least one memory and the computer code configured, with the at least one processor, to cause the apparatus at least to:
    disable, in response to an emergency call information being entered into an apparatus, a network access application and/or cellular authentication in a secure element by at least revoking an authentication of a personal identification number;

placing, at the apparatus and in response to the revoking of the authentication of the personal identification number, an emergency call based on the emergency call information;

request, during the emergency call, entry of the personal identification number at the apparatus; and authenticating, in response to entry of the personal identification number, the personal identification number, the authenticating of the personal identification number enabling the network access application and/or the cellular authentication in the secure element.

15. Apparatus as claimed in claim 14, wherein the at least one memory and the computer code are configured with the at least one processor to cause the apparatus further to:

compare, responsive to an emergency call information being entered, said emergency call information with at least one stored emergency call information and if there is a match, to disable said network access application and/or cellular authentication.

16. An apparatus as claimed in claim 14, wherein said secure element comprises one or more of a universal integrated circuit card and a subscriber identity module.

17. An apparatus as claimed in claim 14, wherein the at least one memory and the computer code are configured with the at least one processor to cause the apparatus further to:

cause additionally the disabling of all of said secure element or at least one additional application on said secure element.

18. A user equipment comprising an apparatus as claimed in claim 14.

* * * * *